US008448921B2

(12) United States Patent
Hernandez

(10) Patent No.: US 8,448,921 B2
(45) Date of Patent: May 28, 2013

(54) JACK WITH SELECTIVELY INTERCHANGEABLE COMPONENTS

(75) Inventor: Hector R. Hernandez, Fullerton, CA (US)

(73) Assignee: Alltrade Tools LLC, Long Beach, CA (US)

( * ) Notice: Subject to any disclaimer, the term of this patent is extended or adjusted under 35 U.S.C. 154(b) by 608 days.

(21) Appl. No.: 12/612,622

(22) Filed: Nov. 4, 2009

(65) Prior Publication Data

US 2011/0101295 A1 May 5, 2011

(51) Int. Cl.

| | |
|---|---|
| ***E02C 3/00*** | (2006.01) |
| ***B66F 3/00*** | (2006.01) |
| ***B60P 1/48*** | (2006.01) |
| ***B62B 3/06*** | (2006.01) |

(52) U.S. Cl.

USPC .............. 254/88; 254/120; 254/8 B; 254/8 R; 254/10 B; 254/2 B; 254/133 R

(58) Field of Classification Search

USPC ............... 254/88, 8 B, 8 R, 10 B, 2 B, 133 R, 254/120

See application file for complete search history.

(56) References Cited

U.S. PATENT DOCUMENTS

| | | | | |
|---|---|---|---|---|
| 4,131,263 | A * | 12/1978 | John | 254/8 B |
| 4,640,495 | A * | 2/1987 | Parsons | 254/8 B |
| 5,651,532 | A * | 7/1997 | Page | 254/8 B |
| 2006/0278856 | A1 * | 12/2006 | Krug | 254/4 B |
| 2008/0303009 | A1 * | 12/2008 | Arzouman | 254/8 B |
| 2010/0102284 | A1 * | 4/2010 | Drake | 254/1 |

* cited by examiner

*Primary Examiner* — Monica Carter
*Assistant Examiner* — Nirvana Deonauth
(74) *Attorney, Agent, or Firm* — John K. Fitzgerald; Fulwider Patton LLP

(57) ABSTRACT

A novel hydraulic jack kit is disclosed comprising a specialized jack configured to be compatible with selectively interchangeable components. The specialized jack on its own is configured to lift vehicles such as motorbikes and snowmobiles completely off the floor, so that the only support is the jack itself. The specialized jack is also configured to receive a platform component that converts the jack into one suitable for lifting automobiles with a large wheel base that will have two wheels remaining on the floor when lifted. It is further configured to receive a platform component that converts the jack into one suitable for lifting a vehicle with a short wheel base, where the elevated vehicle adopts a large angle of elevation. In all configurations, a novel stabilizing structure is provided.

10 Claims, 9 Drawing Sheets

JACK WITH SELECTIVELY INTERCHANGEABLE COMPONENTS

BACKGROUND

The present invention relates to hydraulic jacks for lifting loads such as motorized vehicles and other heavy objects and equipment. Specifically, the invention relates to a versatile modular hydraulic floor jack adapted to lift different types of vehicular load, while being configured at the same time to provide enhanced lateral stability.

Hydraulic floor jacks are known in the art. Typically, a hydraulic floor jack includes a hydraulic ram that is given a mechanical advantage by known means, namely, in which a hydraulic press is harnessed to convert a manual input force into an output force delivered by a piston, the output force being considerably magnified over the input force. The magnified piston force may be applied directly to elevate a load, or it may be utilized to pivot an elevation arm of the floor jack, which elevates the load in a pivoting action.

A number of different types of floor jack have been developed, each for a specialized purpose. For example, a point lift hydraulic jack has been developed which is useful for elevating a motor vehicle. This kind of hydraulic jack applies an upward load to the motor vehicle on what is effectively an upwardly applied point load. (In reality of course, the upwardly applied load is not a precise “point,” but rather a flat plate having a relatively small area, hence it is an “effective” a point load.) An effective point load is desirable, firstly, because a motor vehicle that has been elevated will always have at least two wheels on the ground. These two wheels may be braked so that, in combination with the effective point load, a stable and immovable three point support exists and the motor vehicle will not move or tip while elevated. However, the undercarriage of a motor vehicle typically has a complex shape so that, if a multiple point ram were used to elevate the vehicle, or if a large flat plate were used on the end of the ram, it is likely that the point of lift may shift from one point to another as the vehicle is elevated. This is highly undesirable because the user may not know which point on the underside of the vehicle will eventually be the point of load when the vehicle is fully elevated. Thus, the user may find out too late that an inappropriate point on the underside of the vehicle has become the point of load. The point at which load is applied may be inappropriate because it may buckle, or even worse, may break. For example, a user will try to avoid applying a point of hydraulic lift to a flat floor panel of the motor vehicle because the floor panel may bend out of plane or may be punctured by the hydraulic lift. Therefore, a hydraulic lifting jack with an effective point support is always desirable when lifting motor vehicles because this enables the user to position that point under a strengthened portion of the undercarriage of the vehicle that he knows will sustain the load.

On the other hand, other types of motorized vehicles require a floor lifting jack with different characteristics to allow a workman to gain access to their undercarriage. For example, snowmobiles, motor bikes, and some all-terrain-vehicles each have a relatively small and narrow plan area, and neither type can be lifted at one point to leave two other points on the ground to stabilize the vehicle. Rather, the shapes of these vehicles may require that they be lifted entirely and bodily off the floor while stability against tipping over is provided entirely by the jack itself. To this end, such vehicles are often constructed so that the undercarriage has a flat portion at the center of gravity, and, for this kind of case, hydraulic floor jacks have been developed that have a relatively wide and long “footprint” in contact with the floor. They also have relatively wide and long planar lifting platforms that allow the lifted vehicle to balance on the platform while under elevation. However, where the jack is the only point of support for the vehicle, there is always an increased risk that the jack itself may tipple over, with disastrous consequences. In this regard, some of the prior art jacks that perform this specialized lifting function are made with side wheels that are spaced as widely apart as possible to give as much lateral stability as possible. However, this solution results in a hydraulic jack that occupies a very large area “footprint,” which may add to the overcrowding of a small workshop.

Another example of a vehicle lifting jack is one required for certain lawn tractors or other vehicles that have a wheel base that is too wide to permit a jack to lift the entire vehicle off the floor as in the case of a motorbike or snowmobile. Rather, the front end must be lifted by the front two wheels while the vehicle pivots about the back two wheels. In cases such as this, the front two wheels are driven onto slings or stirrups that are tied into a central lifting arm, and the lifting load is applied to the wheels via the stirrups. The reason that the load is taken by the wheels in this design and not by a central platform to the undercarriage, is that the wheel base of such vehicles may be so short that, when fully lifted in front about the pivoting back wheels, the vehicle slopes upward at a considerable angle. Thus, any surface on the tractor that was flat when parked will slope at the same large angle when the tractor is elevated. This would tend to create a dangerous situation if the lifting were caused by a load applied to the undercarriage because the point of contact will substantially realign itself from horizontal as the vehicle is elevated, producing the possible very undesirable result that the jack slips out of engagement with the tractor. Therefore, loops or stirrups are provided to capture the wheels of the tractor. When elevated, the tractor wheels may freely realign themselves by rotating, without any adverse result on safety.

A noticeable problem that has arisen in the art is that many workshops, both commercial and private, may be required to possess all three types of hydraulic jack described above to deal with the various types of vehicle that must be serviced. This gives rise to issues of financial expense, and also to issues of overcrowding and storage in the workshop for a host of different hydraulic jacks. Moreover, even where all three types of jack are provided in a workshop, the kind that elevates a vehicle entirely off the floor always suffers the risk of instability for which no suitable solution is available.

Thus there is a need in the art for a solution to problems found in the prior art as described above. The present invention addresses these and other needs.

SUMMARY OF THE INVENTION

The present invention is a novel and unique kit of components that extends the useful range operation of a hydraulic jack so that it is able to perform the functions that are typically required to be performed by more than one hydraulic jack. The invention also includes a novel feature for stabilizing a jack to elevate a load completely off the ground, with no portion of the load remaining on the ground.

In a preferred embodiment, the kit comprises a lifting jack that has a left side arm and a right side arm. A set of wheels is provided for moving the hydraulic jack on a floor surface. The jack has a first platform having a first horizontal flat surface with an area of first magnitude for supporting an object balanced on the flat surface, without any portion of the object remaining on the floor. Significantly, a hole is defined in the first platform, the hole being adapted for removably receiving an object inserted from above. A hydraulic lift is provided, configured to elevate the platform. A handle is provided, configured to be removably engaged with the jack for providing an input force into the hydraulic lift whereby the hydraulic lift elevates the platform.

In a preferred embodiment, each side arm defines an opening configured to allow the handle to be snugly passed through both openings at the same time. This arrangement provides for added stability when the jack is being used to elevate a load entirely, with no portion of the load remaining on the floor.

A second platform is provided having an area of second magnitude that is smaller than the first magnitude of the first platform. The second platform defines a downwardly extending protrusion configured to be removably positioned in the hole in the first platform, whereby the first platform is configured to support the second platform above the first platform. The second platform is configured to be rotatable about an axis passing vertically through the hole in the first platform. This feature permits any load on the second platform to realign to take into account strain induced realignments when load is applied.

In a further aspect of the invention, a third platform may be provided, having components extending beyond left and right lateral edges of the first platform. Each component is configured with an opening to receive and support a wheel of a vehicle. The third platform also defines a downwardly extending protrusion configured to be removably positioned in the hole in the first platform, whereby the first platform is configured to support the third platform.

The arrangement thus described permits the user to use the first platform alone to elevate loads entirely, so that no portion of the load remains on the floor. Such loads might be smaller vehicles such as motor bikes and snowmobiles. Optionally, the user may insert the handle used to actuate the jack into openings on either side of the jack in order to provide added stability to the jack under this load condition.

Alternatively, the user may engage the second smaller platform with the first platform, so that the second platform is positioned above the first platform load is taken entirely by the second platform, and no load is applied to the first platform. This arrangement is suitable for large motor vehicles that require a relatively small point of contact from the jack that must be positioned precisely on a reinforced point on the undercarriage of the motor vehicle.

Further alternatively, the user may remove the second smaller platform from the first platform, and instead engage the third platform with the first platform. The third platform, having portions that extend laterally beyond the edges of the first platform, are suitable for receiving and supporting two wheels of a small wheel base vehicle such as a lawn tractor. The wheels are lifted, and may realign themselves by rotation as the vehicle adopts a large angle of inclination to the floor.

Thus, the invention allows up to three potential lifting capabilities to be provided by one jack, in addition to added lateral stability derived from components of the jack that are necessarily present for operation of the jack. Thus, no additional material is required to create this additional stability, and the only additional fabrication needed is to cut two openings in the sides of the jack.

In a further aspect of the invention, the handle, when passed through the openings, includes a fixed ridge at one end of the handle and a movable ridge at an opposite end of the handle, each ridge being configured to reduce wobble of the jack on a floor surface. Preferably, the movable ridge comprises a cylindrical portion slidable over the handle, and an annular portion protruding outwardly from the cylindrical portion.

In another aspect of the invention, the second magnitude (of the second platform) is less than twenty percent the first magnitude (of the first platform). This allows the second platform, when present, to assume all the load when elevating a motor car, with reduced likelihood of a portion of the car undercarriage contacting the first platform. To further reduce this likelihood, the second platform preferably has an aspect ratio of one, and no horizontal dimension of the second platform exceeds six inches. Furthermore, the second platform is preferably positioned above the first platform by at least one inch in order to increase clearance of the load undercarriage from the first platform.

These and other advantages of the invention will become more clearly apparent with reference to the figures and the detailed description of the preferred embodiments.

DETAILED DESCRIPTION OF THE PREFERRED EMBODIMENTS

With reference to the figures, which are shown by way of exemplification and not limitation, a modular hydraulic jack having features of the present invention is described. The present invention initially comprises a specialized lifting jack 20 specially configured for use in combination with other components, under a variety of load and stability conditions.

Figure 1:
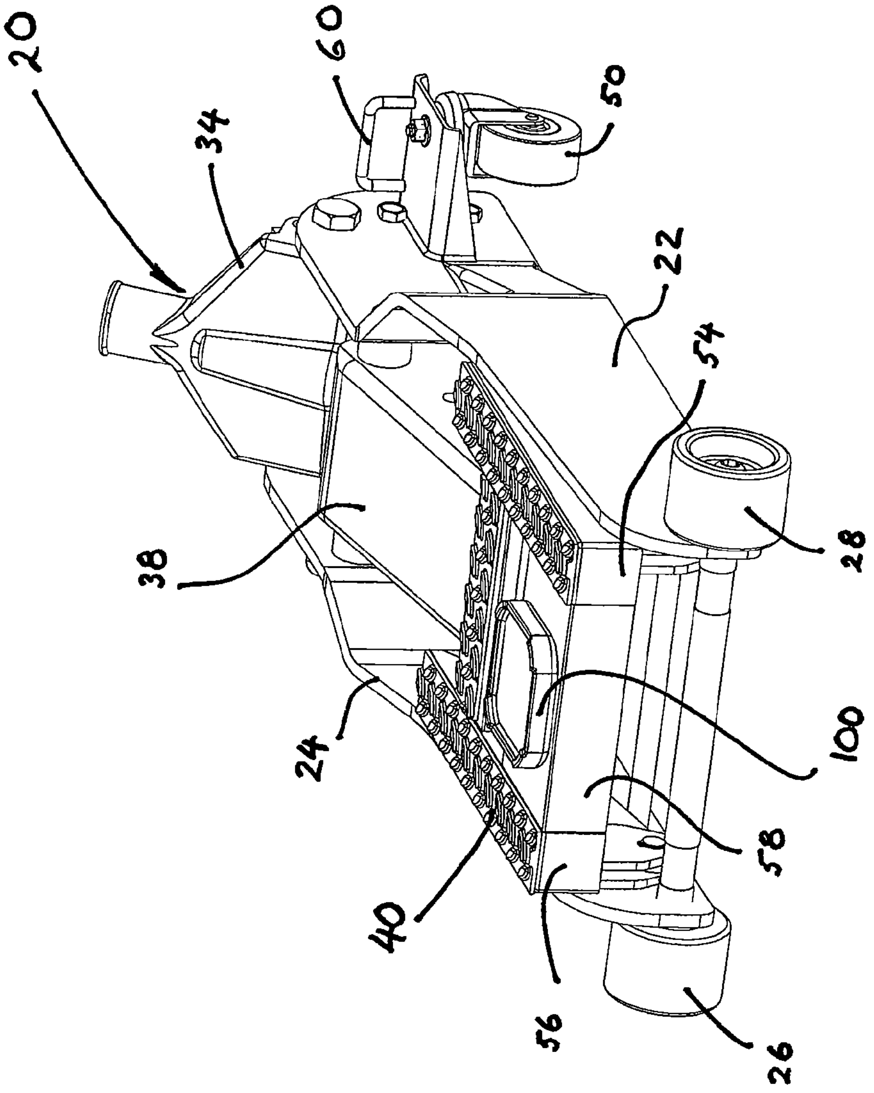
FIG. 1 is a perspective view of a hydraulic jack having features of the present invention, shown in a depressed condition, and shown with certain selected components.
Figure 2:
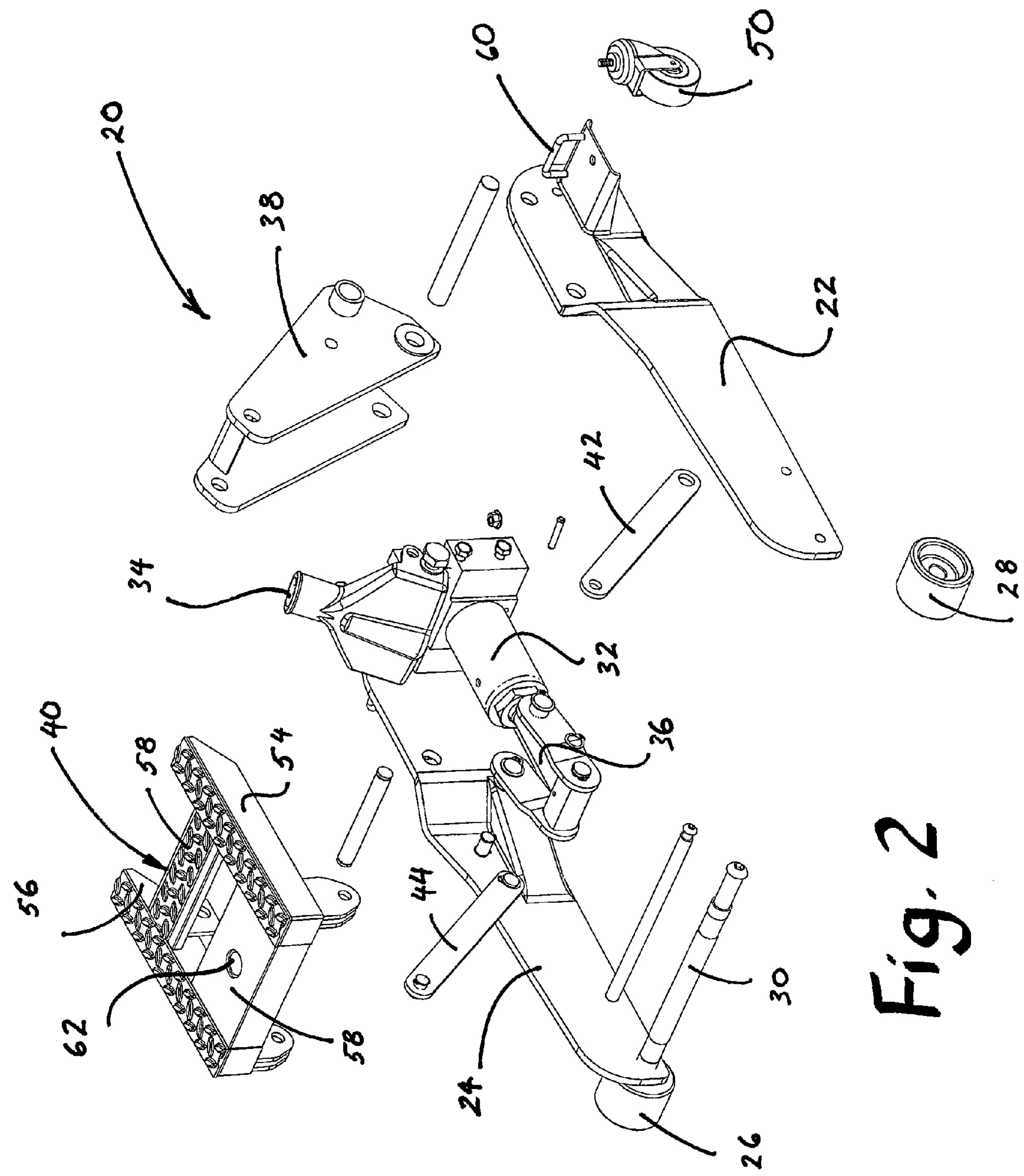
FIG. 2 is an exploded view, shown in perspective, of the hydraulic jack of FIG. 1.

The specialized jack 20 of the present invention may be seen as one of the invention components in each of FIGS. 1-9. Initially, FIG. 2 shows the specialized jack 20 in an exploded view as comprising two opposing left and right outer side arms 22, 24 extending from the front end to the back end of the jack. At the front of the side arms, two front wheels 26, 28 are situated and connected to each other by an axle 30 which also serves to stiffen the jack. Two rear wheels 50 (only one rear wheel visible in the figures) are situated at the rear end of the jack, capable of swiveling independently of each other for providing the jack with stearability. In a preferred embodiment, the side arms are bent so that they are spaced wider apart at the front end of the jack than at the rear end, in order to provide enhanced lateral stability. As will be noted below, stability provided by this spacing of the wheels may be insufficient for some lifting operations, so that a novel and inventive feature is introduced to enhance lateral stability. A hydraulic lift 32 is positioned between the side arms towards the back end of the jack, operable by a hand held lever 300 (seen in FIG. 8) that is adapted to be removably inserted into a pivotable yoke 34 configured to apply a pumping action to a hydraulic press in the lift 32. Manual actuation of the lever causes a piston 36 in the lift to extend forwardly with considerable force, with the result that a lifting arm 38 is caused to pivot upwardly, thereby lifting a platform 40 that may have a load positioned on it. Two stabilizer pivoting arms 42, 44 are also connected between the platform 40 and the side arms 22, 24 so that the platform always assumes a horizontal orientation under all stages of elevation.

As seen for example in FIG. 1, the platform 40 has left and right lateral edges or side members 54, 56 that are parallel with each other, and are spaced apart so as to fit snugly between the forward portions of the side arms 22, 24. The side members 54, 56 each have a length that extends from the front end of the jack to a point where the side arms start to bend inwards. The side members are connected to each other via at least one cross beam 58. The side members and cross beams may be covered with non-slip rubber matting, or the like. Thus, the platform 40 provides what is essentially a square planar support surface suitable for lifting motor bikes or all-terrain vehicles, by which action these vehicles are lifted entirely off the floor and balance on the large support surface of the platform 40 without any portion of the vehicle touching the floor. To facilitate stability of the vehicle on the platform, strap lugs 60 may be provided for tying down straps that are looped around the vehicle to prevent it from tipping off the platform due to accidental bumping while balanced on the platform. Recesses 61 are also provided in the axle 30 that are configured for receiving a strap without slipping. As will be discussed below, one of the remaining problems in the art is the danger of the entire jack plus its strapped on load tipping over if bumped. A novel solution to reducing this danger is identified and described below.

The specialized jack 20 with platform 40 thus far described is suitable for lifting smaller vehicles like snowmobiles, motorbikes, and all-terrain-vehicles entirely off the floor so that the vehicles balance on the wide platform 40. However, the large platform 40 is not suitable for lifting a larger vehicle like a motor car. As noted above, modern motor cars typically have a complex shaped undercarriage, and only a few isolated points on the undercarriage are sufficiently reinforced to receive an upward lifting force from a hydraulic jack. If the large platform 40 is positioned below these points, the uplifting platform does not necessarily apply its uplift force to the reinforced point on the undercarriage, but may spread its force to other adjacent points that are not reinforced, such as the floor of the car. These unreinforced points may bend, or may even be punctured or broken with considerably disadvantageous results.

Figure 3:
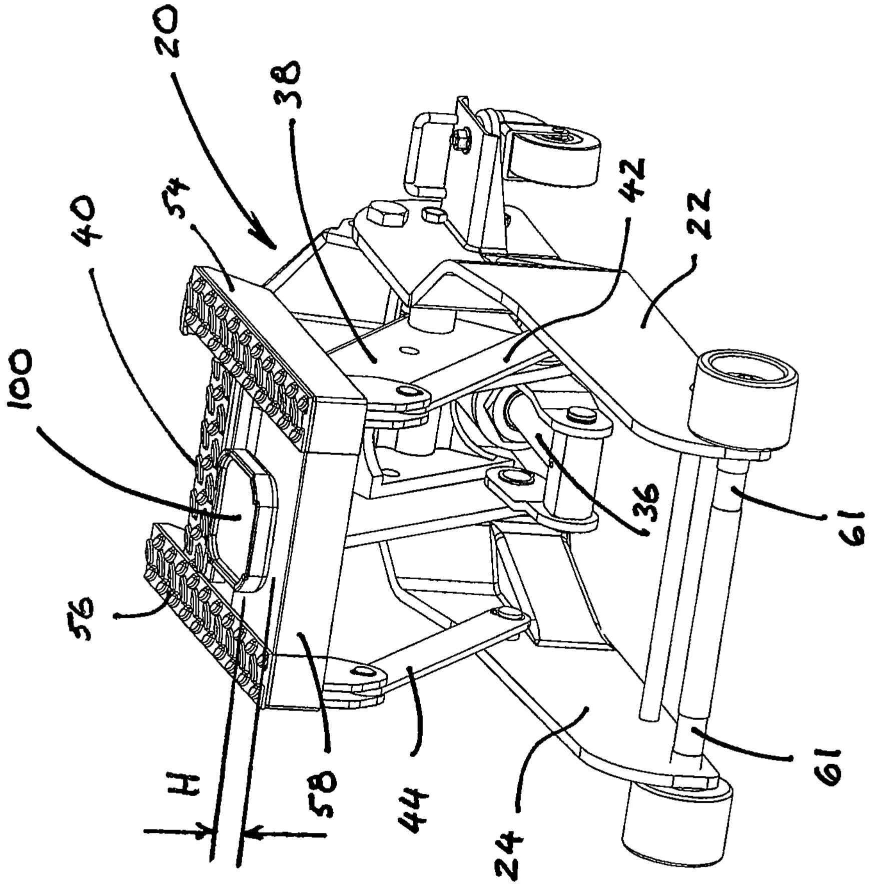
FIG. 3 is a perspective view of the jack of FIG. 1, shown in an elevated condition.
Figure 4:
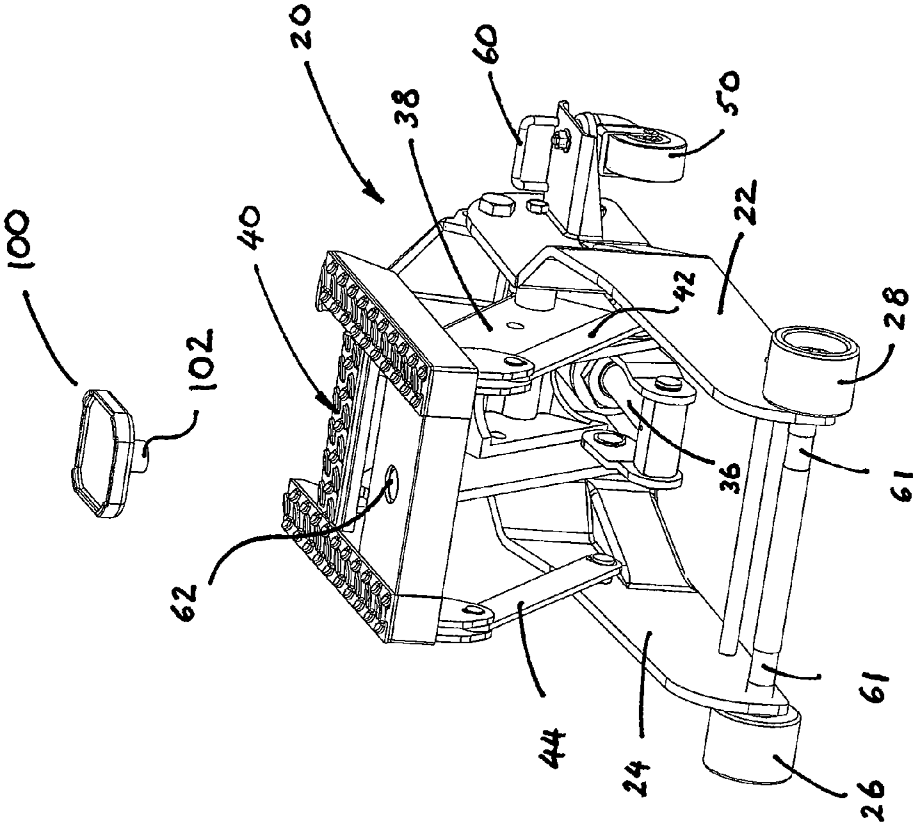
FIG. 4 is the view of the jack shown in FIG. 3, in a partially disassembled condition.
Figure 5:
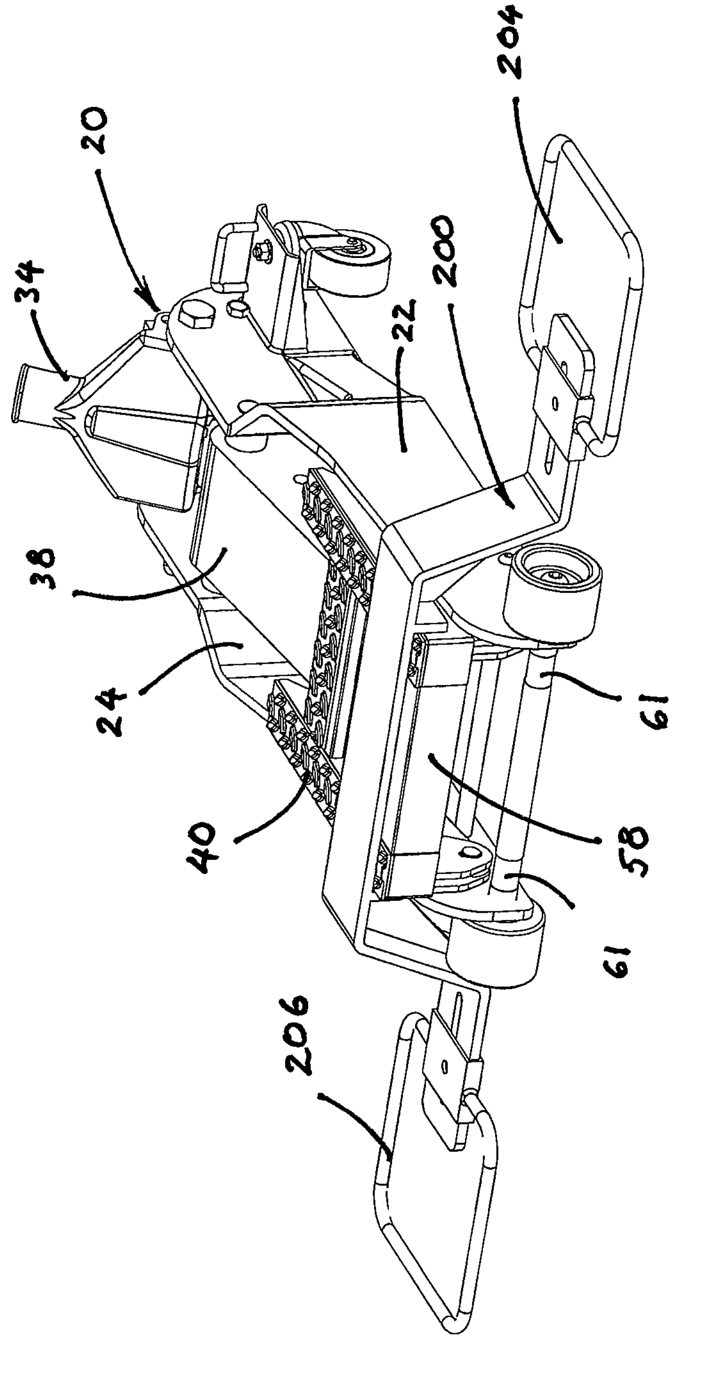
FIG. 5 is a perspective view of the hydraulic jack having features of the present invention, shown in a depressed condition, and shown with different selected components than those shown in FIG. 1.

Thus, in order to solve this problem, a second smaller platform or saddle 100 is provided (seen in FIGS. 1, 3 and 4) that may be installed and removed from the platform 40 as desired, and which protrudes above the level of the platform 40 by an amount "H" (as indicated in FIG. 3) so that it may be positioned to connect with reinforced points on the undercarriage of the car without any point on the platform 40 coming into contact with the undercarriage. In order to achieve this result, a hole 62, is provided in one of the cross beams 58 of the platform 40. The hole is configured to receive a protrusion or nib 102 that extends downwardly from the saddle 100. When the nib 102 is positioned in the hole 62 in the platform, the upper surface of the saddle protrudes above the upper surface of the platform by an amount "H" (FIG. 3) that preferably exceeds one inch. Under this configuration, the saddle 100 is also configured to be capable of rotating about an axis extending vertically through the hole 62. This aspect is useful for allowing the saddle to realign itself to a small degree as the car is lifted, because it frequently occurs that small strain adjustments take place as a heavy load is lifted, and surfaces that were in contact before the load is applied may be removed from contact by these small strains after load is applied. Thus, rotation of the saddle 100 about the nib 102 is an important capability in the present invention. Also importantly, the area of the saddle (within the perimeter of the saddle) is substantially less than the area of the wide platform 40 (within the perimeter of the platform 40), preferably being less than 20% of the area of the platform 40. Further preferably, no horizontal dimension of the saddle 100 should exceed six inches and also, the platform should preferably be symmetrical about two orthogonal axes, as seen in the figures, so that it has an aspect ratio of one. Thus, when the saddle 100 is positioned on the platform 40 for elevating a load, and the platform is elevated by hydraulic jacking action while positioned under a car, the saddle 100 will find the desired point of load on the undercarriage of the car before any portion of the platform 40 can come into contact with any other portion of the undercarriage. Any realignment due to strain is accommodated by the rotating saddle 100. Thus, the same specialized jack 20 can be used to lift cars using selected component in the form of the saddle 100 as can be used to lift small vehicles such as snowmobiles, motorbikes, and all-terrain-vehicles using only the larger platform 40. This aspect results in considerable cost savings because a workshop needs to acquire only one specialized hydraulic jack 20, to be used in combination with a special mating saddle 100, whereby the combination is configured to expand the utility of the hydraulic jack to be capable of use with a broader range of vehicles.

Figure 6:
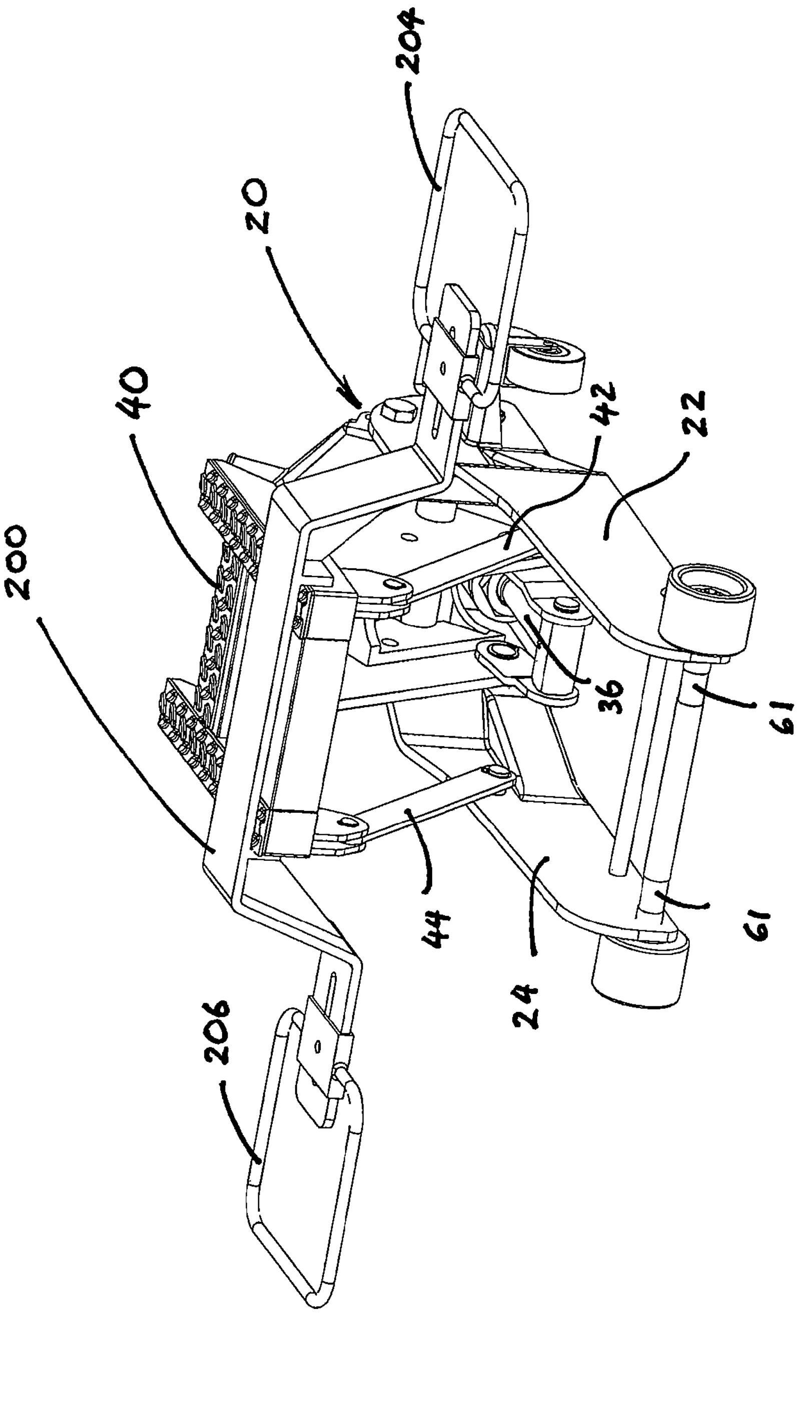
FIG. 6 is a perspective view of the jack of FIG. 5, shown in elevated condition.
Figure 7:
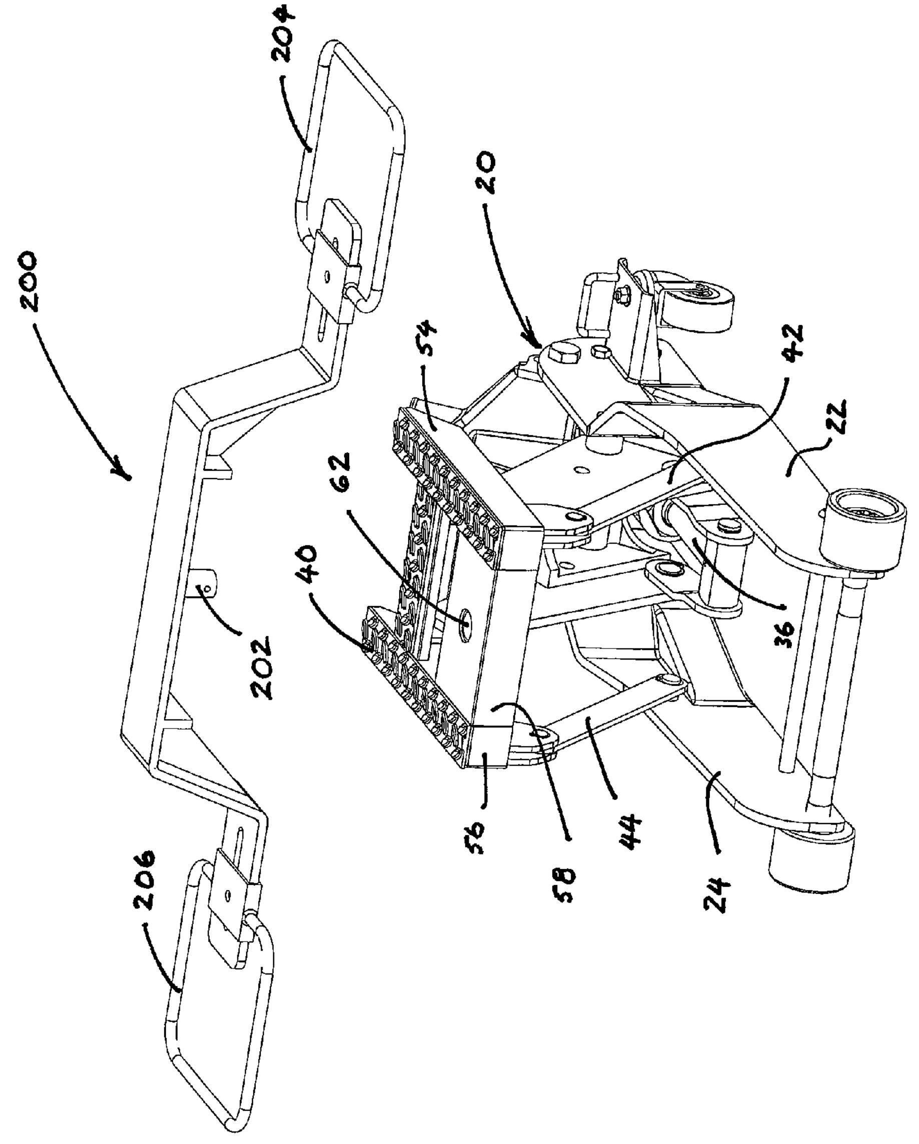
FIG. 7 is a perspective view of the jack in FIG. 6, shown in partially disassembled condition.

Extending the same principle as described above, the specialized jack may be used by selecting yet another lifting platform which is uniquely configured to be removably added to the specialized hydraulic jack 20 as part of the present invention. In this case, with reference to FIGS. 5, 6, and 7, a lateral lifting platform 200 is provided having the characteristic that it too has a downwardly extending nib 202 at a center of symmetry of the platform 200. When the nib is inserted in the hole 62 in the cross beam 58, the lateral lifting platform 200 lies across the wide planar platform 40 and extends beyond either lateral edge 54, 56 of the platform 40. Each side of platform 200 terminates in a opening, or stirrup 204, 206 configured to receive and support a wheel of a lawn tractor or similar vehicle. Thus, when the jack 20 is in a lowered configuration (as seen in FIG. 6), the stirrups 204, 206 rest on the floor surface, allowing a small lawn tractor to drive up to the jack and rest a front wheel within each stirrup. When the jack 20 is elevated, as seen in FIG. 7, the lawn tractor is lifted upwards by its wheels. Because the wheels are able to rotate, they are able to realign as the tractor is lifted, thereby avoiding the danger that would arise if the point of lift were applied against a fixed point on the tractor.

In yet another aspect of the invention, a feature is provided that adds lateral stability to the specialized jack 20 while adding no additional material or moving parts to the specialized jack. As will be appreciated by one of ordinary skill, the lifting condition described above that creates the greatest danger of instability is where the wide platform 40 is used to support a snowmobile or motorbike whereby the entire vehicle is lifted off the floor, and the jack 20 alone provides stability to the elevated load because the only support for the load is the jack itself. Typically, this lifting is for only a short period while oil is being drained or the like, but occasionally lifting may be required for a longer period and in this case the question of stability becomes more important because the danger of inadvertently bumping the elevated vehicle is increased.

Figure 8:
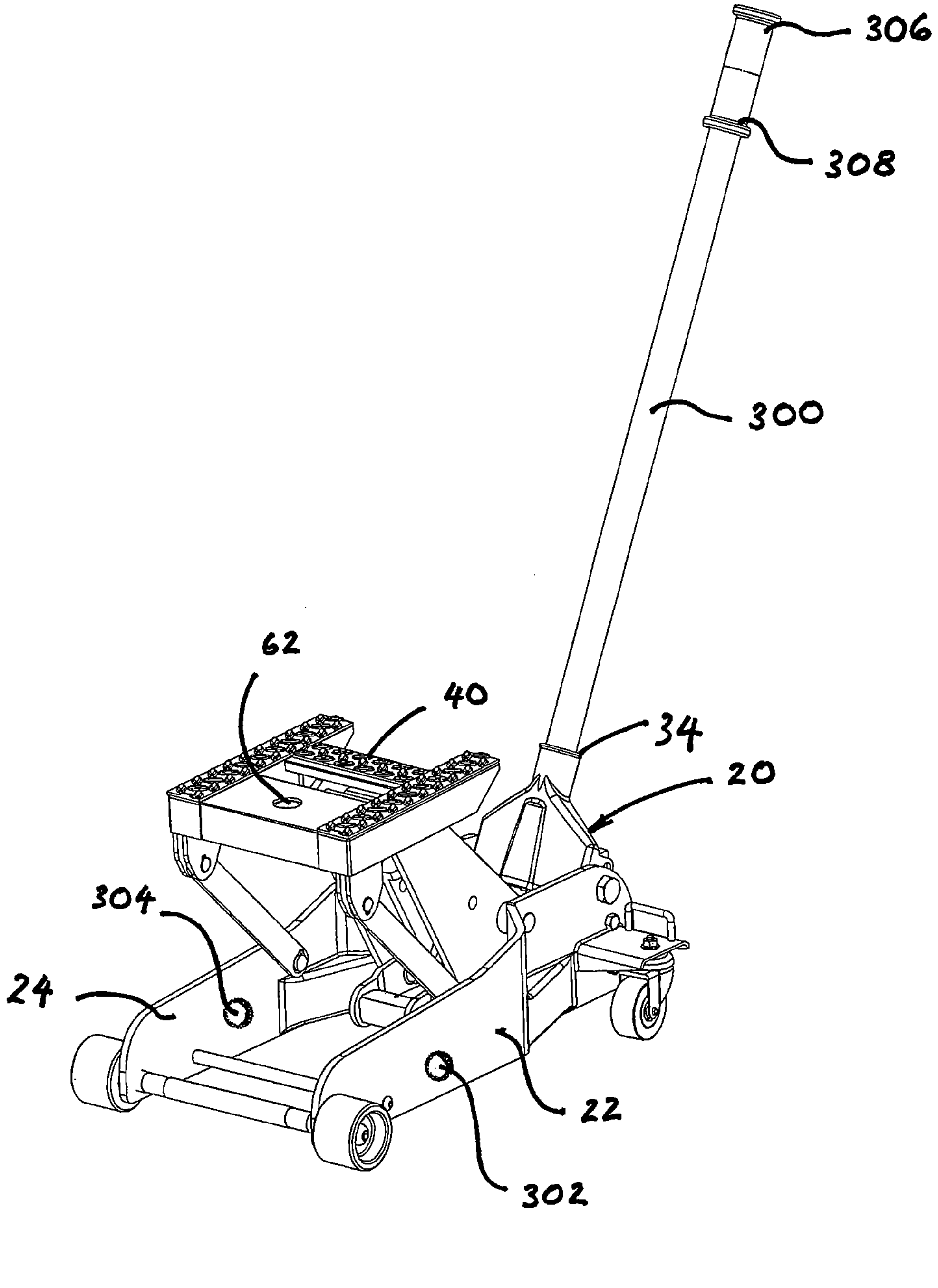
FIG. 8 is a further perspective view of a hydraulic jack having features of the present invention, shown in a first stability condition.
Figure 9:
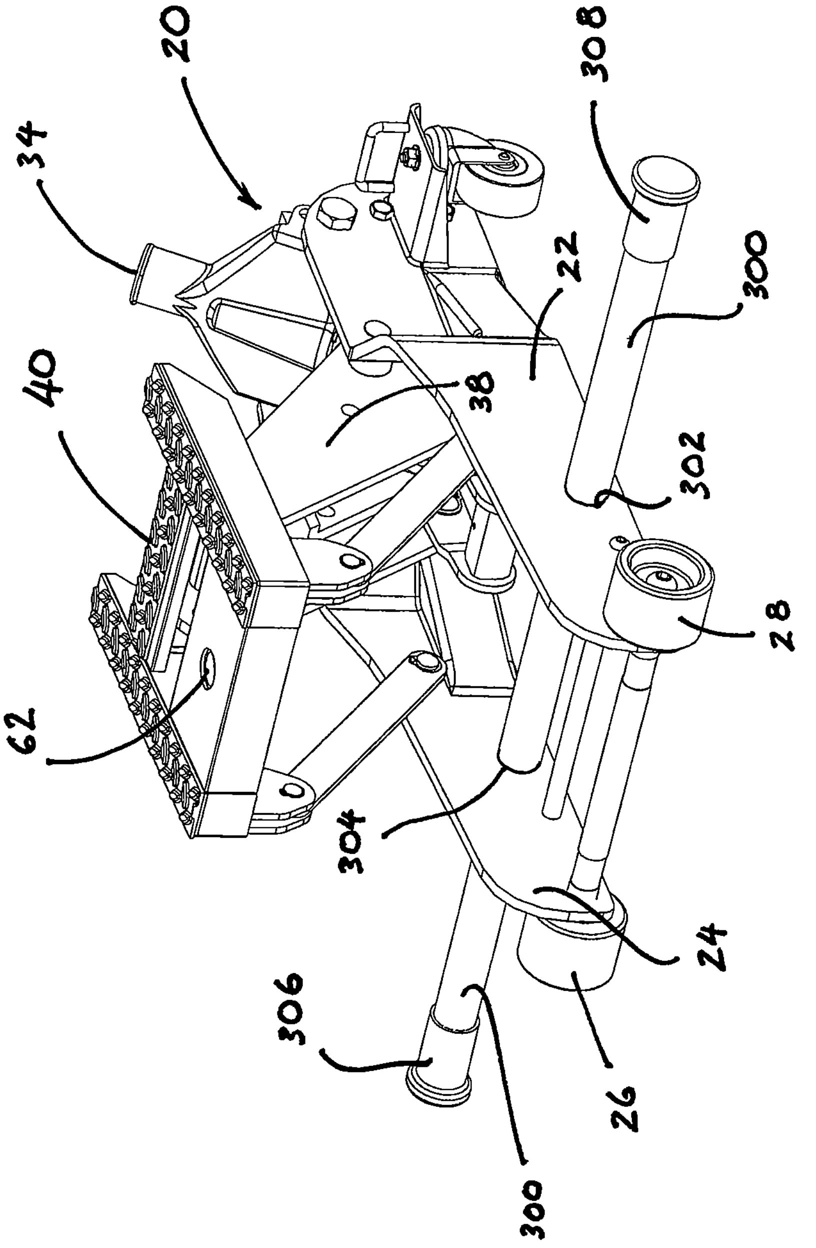
FIG. 9 is a perspective view the jack of FIG. 8, shown in a second stability condition.

Accordingly, the specialized jack of the present invention is configured to have two holes 302, 304 in each side arm 22, 24 as seen in FIG. 8. The holes are sized to permit the removable activation handle 300, which is normally planted in the yoke 34, to be removed from the yoke and passed snugly through both holes 302, 304 so that about the same length of handle extends from each side of the jack, as seen in FIG. 9. By "snugly" it is meant that the handle passes easily, but once in position any wobble of the jack about the handle does not appreciably diminish safety. In order to bring the ends of the handle flush with the floor level, a first ridge 306 is attached on one end of the handle. On the other side of the handle, a second movable ridge 308 is provided. Preferably, the second movable ridge 308 is in the form of a cylinder with an annular portion that protrudes radially outwardly, as seen in FIGS. 8 and 9. The cylinder may slide along the handle 300 so that it may be removed while the handle 300 is being introduced into the openings 302, 304. Once the handle is in the desired position within the openings, the movable ridge 308 is slipped on the free end of the handle. Thus, the handle 300 positioned across the jack 20 provides extra stability to the jack, and the two ridges 306, 308 reduce any wobble in the event the jack plus load is bumped, and the handle resists any overturning moment that might be applied to the loaded jack. Once the need for added stability for the jack has passed, the movable ridge 308 may be removed from the handle 300 and the handle removed from its position lying across the jack 20. The movable ridge 308 is then reinstalled on the handle 300 for safekeeping, as seen in FIG. 8, and the handle is inserted in the yoke 34 where it will reside until next required to provide lateral stability to the elevated jack.

Thus, the present invention addresses with novel and useful features needs that are found in the art of hydraulic lifting jacks. The present invention may, of course, be carried out in other specific ways than those herein set forth without departing from the essential characteristics of the invention. The present embodiments are, therefore, to be considered in all respects as illustrative and not restrictive.

I claim:

1. A jack kit, comprising: a lifting jack having, a left side arm and a fight side arm, a set of wheels for moving the hydraulic jack on a floor surface; a first platform having a first horizontal flat surface with an area of first magnitude for supporting an object balanced on the flat surface; a hole defined in the first platform adapted for removably receiving an object inserted from above; a hydraulic lift configured to elevate the platform; a handle configured to be removably engaged with the jack for providing an input force into the hydraulic lift whereby the hydraulic lift elevates the platform; a pivotable yoke configured to removably receive the handle and to apply a pumping action to a hydraulic press in the lifting jack; wherein, each side arm defines an opening configured to allow the handle to be snugly passed through both openings at the same time; a second platform having an area of second magnitude smaller than the first magnitude, the second platform defining a downwardly extending protrusion configured to be removably positioned in the hole in the first platform, whereby the first platform is configured to support the second platform above the first platform and the second platform is configured to be rotatable about an axis passing vertically through the hole in the first platform; a third platform having components extending beyond left and fight lateral edges of the first platform, each component being configured with an opening to receive and support a wheel of a vehicle, the third platform defining a downwardly extending protrusion configured to be removably positioned in the hole in the first platform, whereby the first platform is configured to support the third platform; wherein the handle, when passed through the openings, includes a fixed ridge at one end of the handle and a movable ridge at an opposite end of the handle, each ridge being configured to reduce wobble of the jack on a floor surface, and further wherein, the movable ridge comprises a cylindrical portion slidable over the handle, and an annular portion protruding outwardly from the cylindrical portion.

2. The jack kit of claim 1, wherein the second magnitude is less than twenty percent the first magnitude.

3. The jack kit of claim 1, wherein the second platform has an aspect ratio of one.

4. The jack kit of claim 3, wherein no horizontal dimension of the second platform exceeds six inches.

5. The jack kit of claim 1, wherein the second platform is positioned above the first platform by at least one inch.

6. A jack kit, comprising: a lifting jack having, a left side arm and a right side arm, a set of wheels for moving the hydraulic jack on a floor surface; a first platform having a first horizontal flat surface with an area of first magnitude for supporting an object balanced on the flat surface; a hole defined in the first platform adapted for removably receiving an object inserted from above; a hydraulic lift configured to elevate the platform; a handle configured to be removably engaged with the jack for providing an input force into the hydraulic lift whereby the hydraulic lift elevates the platform; a pivotable yoke configured to removably receive the handle and to apply a pumping action to a hydraulic press in the lifting jack; wherein, each side arm defines an opening configured to allow the handle to be snugly passed through both openings at the same time; a second platform having an area of second magnitude smaller than the first magnitude, the second platform defining a downwardly extending protrusion configured to be removably positioned in the hole in the first platform, whereby the first platform is configured to support the second platform above the first platform and the second platform is configured to be rotatable about an axis passing vertically through the hole in the first platform; wherein the handle, when passed through the openings, includes a fixed ridge at one end of the handle and a movable ridge at an opposite end of the handle, each ridge being configured to reduce wobble of the jack on a floor surface, and further wherein the movable ridge comprises a cylindrical portion slidable over the handle, and an annular portion protruding outwardly from the cylindrical portion.

7. The jack kit of claim 6, wherein the second magnitude is less than twenty percent the first magnitude.

8. The jack kit of claim 6, wherein the second platform has an aspect ratio of one.

9. The jack kit of claim 8, wherein no horizontal dimension of the second platform exceeds six inches.

10. The jack kit of claim 6, wherein the second platform is positioned above the first platform by at least one inch.

* * * * *